(12) United States Patent
Land et al.

(10) Patent No.: US 6,505,246 B1
(45) Date of Patent: Jan. 7, 2003

(54) USER INTERFACE FOR SYSTEM MANAGEMENT APPLICATIONS

(75) Inventors: Timothy Lloyd Land, Moorpark, CA (US); Barry William Laffoon, Glendale, CA (US)

(73) Assignee: Candle Distributed Solutions, Inc., Santa Monica, CA (US)

( * ) Notice: Subject to any disclaimer, the term of this patent is extended or adjusted under 35 U.S.C. 154(b) by 0 days.

(21) Appl. No.: 09/223,090

(22) Filed: Dec. 30, 1998

(Under 37 CFR 1.47)

(51) Int. Cl.⁷ .............................. G06F 15/16; G06F 3/00
(52) U.S. Cl. ........................ 709/224; 345/329; 345/333
(58) Field of Search .................................. 709/223, 224, 709/203; 345/333, 334, 335, 339, 356, 329

(56) References Cited

U.S. PATENT DOCUMENTS

| | | | |
|---|---|---|---|
| 5,109,486 A | | 4/1992 | Seymour |
| 5,483,468 A | | 1/1996 | Chen et al. |
| 5,506,955 A | | 4/1996 | Chen et al. |
| 5,553,235 A | | 9/1996 | Chen et al. |
| 5,781,703 A | * | 7/1998 | Desai et al. .................. 706/50 |
| 5,958,012 A | * | 9/1999 | Battat et al. ................ 709/224 |
| 5,961,596 A | * | 10/1999 | Takubo et al. ............... 709/224 |
| 5,961,598 A | * | 10/1999 | Sime ........................... 709/224 |
| 5,974,237 A | * | 10/1999 | Shurmer et al. ............ 709/224 |
| 6,003,079 A | * | 12/1999 | Friedrich et al. ........... 709/224 |
| 6,148,335 A | * | 11/2000 | Haggard et al. ............ 709/224 |
| 6,208,345 B1 | * | 3/2001 | Sheard et al. .............. 345/356 |
| 6,247,050 B1 | * | 6/2001 | Tso et al. ................... 709/224 |
| 6,272,537 B1 | * | 8/2001 | Kekic et al. ................ 709/223 |

\* cited by examiner

*Primary Examiner*—Mark H. Rinehart
*Assistant Examiner*—Marc D. Thompson
(74) *Attorney, Agent, or Firm*—Gates & Cooper

(57) ABSTRACT

A system for presenting performance and system management data on a computer monitor. The system comprises a network, one or more presentation views, a data server, and a controller. The network interconnects a plurality of computer systems. The presentation views are defined in a memory of one of the computer systems in the network, receive commands for collecting selected performance data on the presentation view's associated computer system, and collect and present the selected performance data. The data server is executed by one of the computer systems in the network, generates requests for the selected performance data, and stores the collected selected performance data returned in response to the requests. The controller is executed by one of the computer systems in the network, translates the requests generated by the data server into the commands for the presentation views, transmits the commands to the presentation views, and forwards the collected performance data to the data server for storage.

34 Claims, 14 Drawing Sheets

USER INTERFACE FOR SYSTEM MANAGEMENT APPLICATIONS

BACKGROUND OF THE INVENTION

1. Field of the Invention

The invention relates in general to user interfaces for computer systems, and more particularly, to a user interface for system management applications.

2. Description of Related Art

Computer systems have become increasingly more complex as computers are used to perform more tasks in both the business and personal environments. Consequently, performance monitoring and system management of the computer systems has become more difficult, because the system interconnections, larger number of users, geographically diverse sources of data, and other items have made system management more complicated.

Further, each user of the system has different needs and desires for performance data presentation and system management data presentation. In conventional computer performance monitoring applications, the monitoring application generates a request for data, such as "How busy is the CPU?". This request is sent by the monitoring application to a data subsystem having such information via the network transport system. The data subsystem returns the information requested to the monitoring application which then processes the data as required. Typically, the data is presented in a standardized format.

The systems to be monitored often include complex computer networks that may include mainframes, minicomputers, workstations, etc. The information to be monitored continuously becomes more complicated so that there are enormous amounts of information to be analyzed. In order to reduce the amount of data to be reviewed by the system operators, some techniques have been developed to further filter the data before it is reviewed by the operator. One example is the display by exception technique once the data has been collected, wherein the internal logic of the system displays data to the operator in accordance with a predicate logic test. The data that has been retrieved is compared to a predetermined predicate or threshold level and is displayed to the operator if and only if the data exceeds the predicate or threshold.

As the computer network systems to be monitored grow in size and complexity, the data to be monitored and tested grows the same way. What are needed are improvements in the presentation of system management data and performance data to reduce the substantial computational time, and other overhead requirements, of conventional monitoring applications.

It can be seen, then, that there is a need in the art for a management system that can manage diverse data sources. It can also be seen, then, that there is a need in the art for a management system that can present data in different formats.

SUMMARY OF THE INVENTION

To overcome the limitations in the prior art described above, and to overcome other limitations that will become apparent upon reading and understanding the present specification, the present invention discloses a system for presenting performance and system management data on a computer monitor. The system comprises a network, one or more presentation views, a data server, and a controller. The network interconnects a plurality of computer systems. The presentation views are defined in a memory of one of the computer systems in the network, receive commands for collecting selected performance data on the presentation view's associated computer system, and collect and present the selected performance data. The data server is executed by one of the computer systems in the network, generates requests for the selected performance data, and stores the collected selected performance data returned in response to the requests. The controller is executed by one of the computer systems in the network, translates the requests generated by the data server into the commands for the presentation views, transmits the commands to the presentation views, and forwards the collected performance data to the data server for storage.

The present invention allows for various data sources to be presented and compared within one window that is definable by the user, as opposed to multiple windows pre-defined by the authors of the System Management product(s). This allows users more flexible access to data, as well as better and more efficient use of computer resources.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples of a method, apparatus, and article of manufacture in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a system for presenting performance and system management data on a computer monitor. The system comprises a network, one or more workspaces, a data server, and a controller. The network interconnects a plurality of computer systems. The workspaces are defined in a memory of one of the computer systems in the network, receive commands for collecting selected performance data on the workspace's associated computer system, and collect and present the selected performance data. The data server is executed by one of the computer systems in the network, generates requests for the selected performance data, and stores the collected selected performance data returned in response to the requests. The controller is executed by one of the computer systems in the network, translates the requests generated by the data server into the commands for the workspaces, transmits the commands to the workspaces, and forwards the collected performance data to the data server for storage.

The present invention allows for various data sources to be presented and compared within one window that is definable by the user, as opposed to multiple windows pre-defined by the authors of the System Mangement product(s). This allows users more flexible access to data, as well as better and more efficient use of computer resources.

The present invention is a graphical user interface incorporating a user-authorable, multi-pane set of visual presentations that provide filtered views on one or more sets of data. The design introduces the concept of a workspace that associates a set of data of arbitrary origin with an extensible set of specific visual presentations, filtered by user-authorable logical expressions. The complete definition of a workspace is preserved in an external data store. The definitions can be associated with specific end-user identifiers, e.g., logon ID's, or can be generically keyed to allow access by a wider set of end-users, e.g., by department or user group. The definitions can also be linked together and parameterized to facilitate contextual navigation between workspaces. Each workspace can be assigned a name, called a workspace alias, that allows direct retrieval of a workspace by the end-user. The user interface supports multiple, independent frame windows being active concurrently, thus allowing multiple, independent workspaces to be viewed simultaneously.

Hardware Environment

Figure 1:
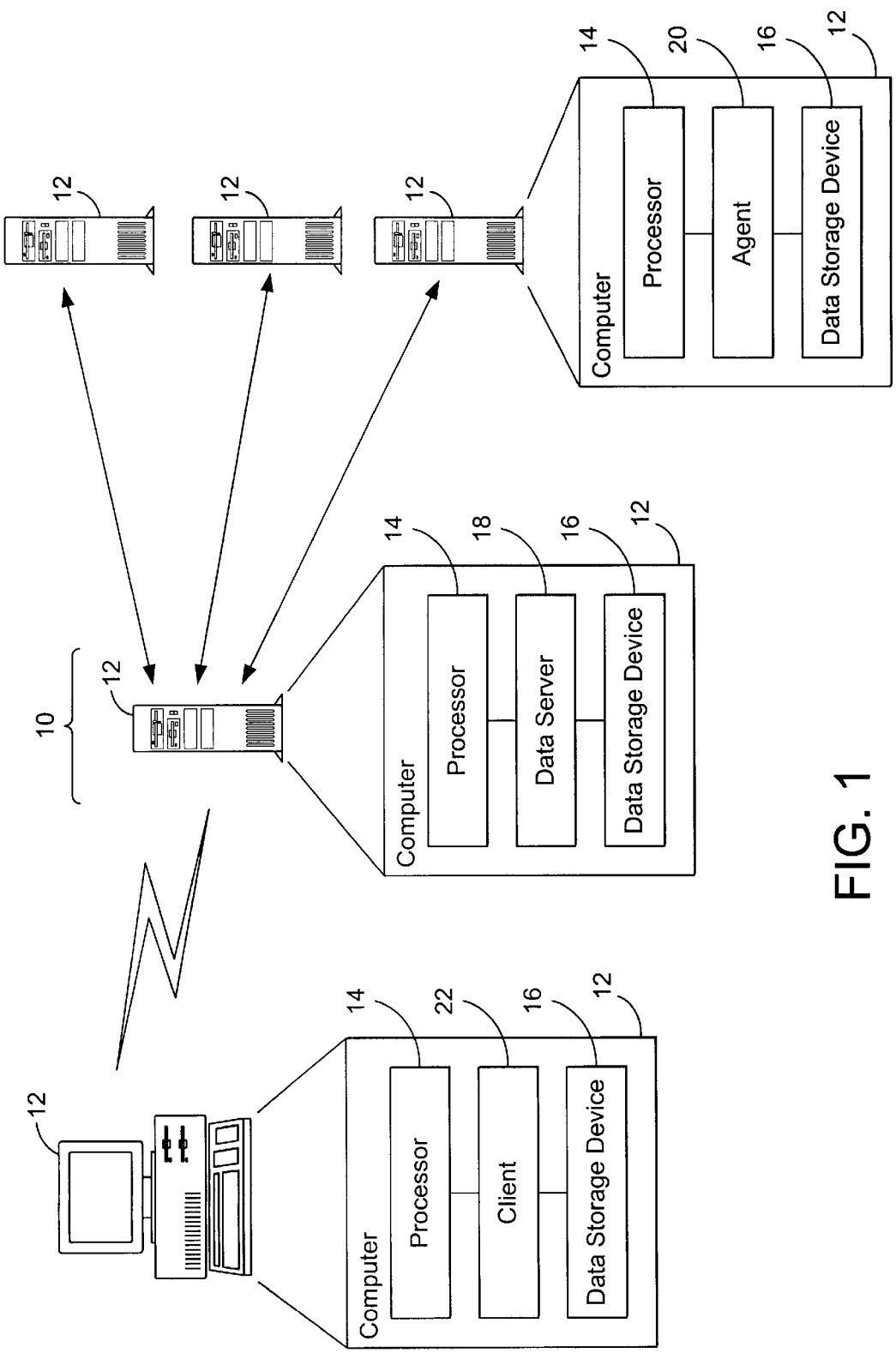
FIG. 1 is an exemplary hardware environment used to implement the preferred embodiment of the invention.

FIG. 1 is a block diagram that illustrates an exemplary hardware environment for the present invention. The present invention is typically implemented using a computer network 10, which includes a plurality of interconnected computer systems 12, each of which may comprise mainframes, minicomputers, workstations, LAN servers, personal computers, etc., and each of which may execute any number of different application programs. The exemplary environment illustrated in FIG. 1 is not intended to limit the present invention. Indeed, other alternative hardware environments may be used without departing from the scope of the present invention. Each computer system 12 typically contains a processor 14 and a data storage device 16. Some computer systems 12 have external data storage devices 16 as shown.

The present invention is a network 10 monitoring system comprised of Data Servers 18, Agents 20, and Clients 22. Although only an exemplary configuration of Data Servers 18, Agents 20, and Clients 22 is illustrated in FIG. 1, any number of such components may be used in accordance with the present invention.

Generally, the Data Servers 18, Agents 20, and Clients 22 comprise computer programs that are tangibly embodied in a computer-readable medium or carrier, e.g. fixed and/or removable data storage and/or data communication devices. These computer programs may be loaded from such devices into the random access memory of one or more of the computer systems 12 for execution. These computer programs comprise instructions which, when read and executed by a computer system 12, cause the computer system 12 to perform the steps necessary to execute the steps or elements of the present invention.

Data Server

The Data Server 18 collects and stores performance data from one or more computer systems 12 in the network 10. In the preferred embodiment, a relational database model is described, although persons of ordinary skill in the art could easily use other types of databases. As a relational database, the Data Server 18 is equipped with one or more data retrieval engines, such as those using conventional structured query language (SQL) statements. Data is stored in the Data Server 18 and retrieved therefrom by one or more application programs, including the Clients 22.

Each Data Server 18 may be located on any of the computer systems 12 or on a specialized computer system 12 which is linked with networked computer systems 12 by the network 10. Preferably, if there are multiple Data Servers 18 in the computer network 10, one of them is designated a Hub Data Server 18 that centrally manages and/or accumulates data from the other Data Servers 18.

Any application program may direct data and instructions to and from the Data Server 18 for storage and/or retrieval therein. Thereafter, by submitting an appropriate inquiry, such as an SQL statement, any application program may request the retrieval of such data in the Data Server 18.

Agent

The Agent 20 works in conjunction with the Data Server 18, and provides communication services with the Clients 22. The Agent 20 also translates requests received from the Data Server 18 into commands, collects data from the Clients 22, and forwards the data to the Data Server 18 for storage therein.

The Client 22 is illustrated as a single client, but can be many clients 22 to show that each user can define a unique Client that is customized to the user's desires and needs. There can be a global Client 22 or multiple Clients 22 on a single node or workstation 12 within the system 10.

Relationships and Operation

Figure 2:
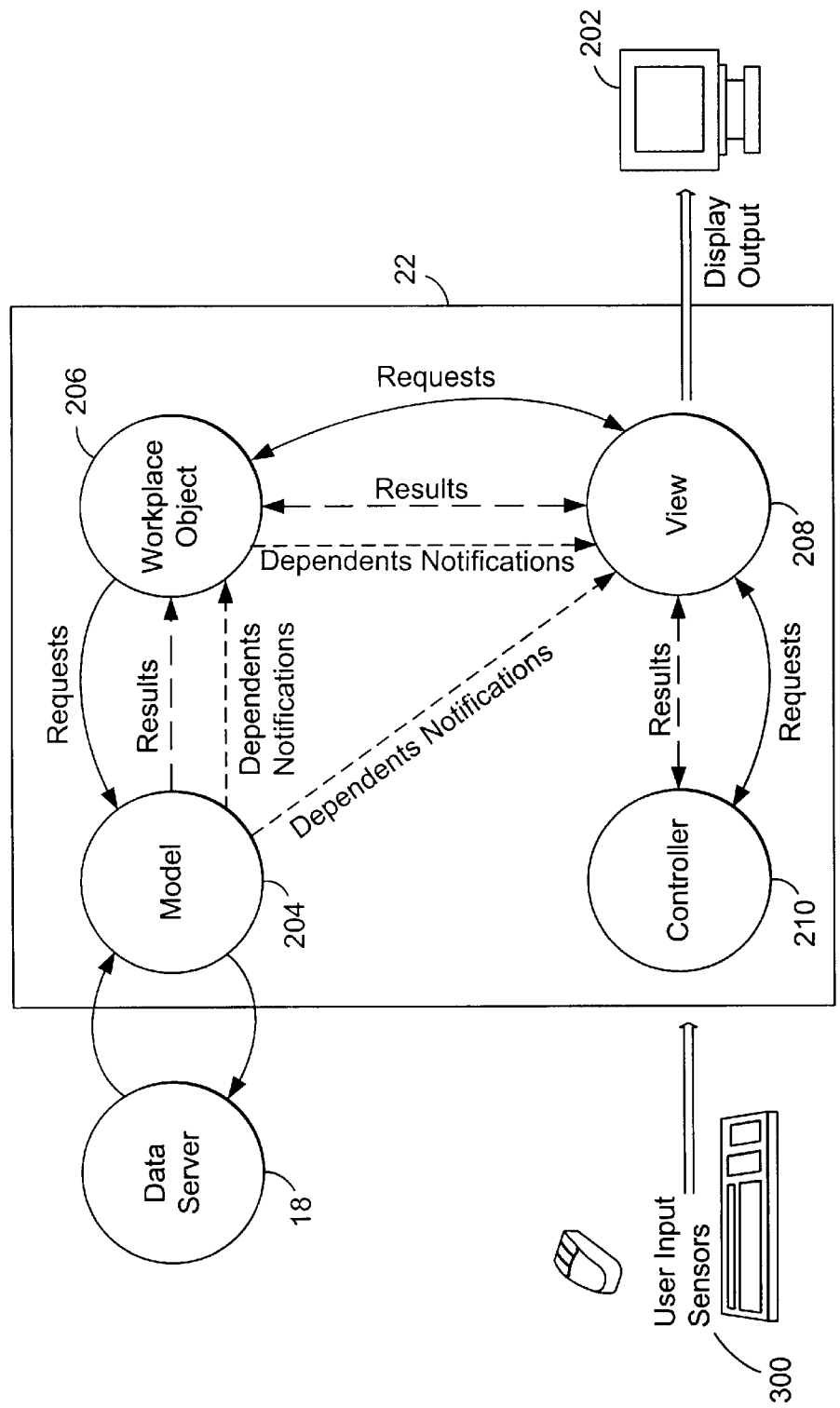
FIG. 2 illustrates an architectural view of a client according to the preferred embodiment of the present invention.

FIG. 2 illustrates an architectural view of a client according to the preferred embodiment of the present invention.

FIG. 2 illustrates Client 22 as it relates to the present invention. Client 22 acts as an interface between data server 18, input devices 200, and display device 202. Within client 22, there are several functions performed by model 204, workplace object 206, view 208, and controller 210. Workplace object 206 acts as a visual proxy for model 204. View 208 (also called presentation view, workspace, or presentation) is managed by workplace object 206 and uses controller 210 objects to interact with the outside world, i.e., input devices 200. Model 204, workplace object 206, and view 208 use the Observer pattern to communicate and synchronize state changes. Model 204 interacts with data server 18 to request and receive data for presentation via model 204, workplace object 206, and view 208. Each client 22 can have one or more model 204, workplace object 206, view 208, and controller 210 for display of data from data server 18 on display device 202.

This client 22 architecture is also influenced by a dimension of IBM's Systems Application Architecture (SAA) known as "Common User Access" (CUA '91). CUA '91 is a set of design guidelines for building object-oriented user interfaces. CUA '91 promotes separation of application data (models 204) from the presentation of the application data (views 208). The architecture introduces workplace objects 206 and containment. Workplace objects 206 are "visual proxies" associated with some underlying model 204 object. The workplace objects 206 allow the user to indirectly manipulate the state of underlying models 204 and launch different presentations (views 208) of that model 204. In this way, the workplace object 206 acts as a visual intermediary between the model 204 and the set of views 208 providing presentations of the state of that model 204.

Figure 3:
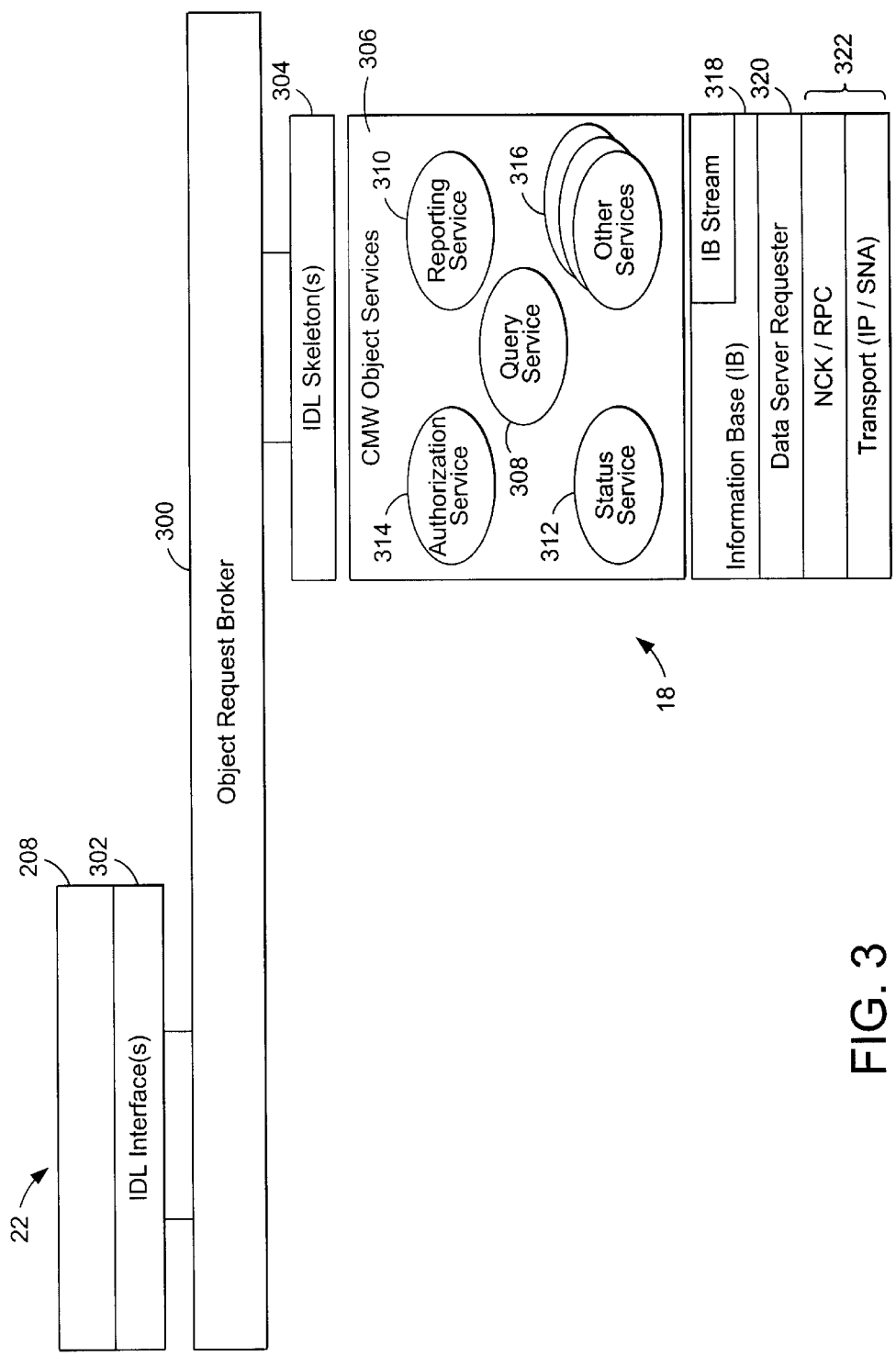
FIG. 3 illustrates the object request broker and object services of the present invention.

FIG. 3 illustrates the object request broker and object services of the present invention. Client 22 needs a medium for communicating with data server 18 to obtain data, distribute objects, etc. from data server 18. Object request broker (ORB) 300 is the medium used in the present invention. Within client 22, an interface 302 is used to standardize the requests, etc. from view 208 to ORB 300. Similarly, interface 304 is used to standardize the interactions between data server 18 and ORB 300.

Data server 18 provides object-based services 306 to access, report, and otherwise manipulate the data requested by client 22. These services 306 are comprised of query service 308, reporting service 310, status service 312, authorization service 314, and other services 316. Further, data server 18 is comprised of an information base 318, a data server requester 320, and transport and other data handlers 322.

The query service 308 provides a general capability to support query operations on a collection of objects within data server 18. Query service 308 comprises general manipulation operations including selection, insertion, updating, and deletion of objects, as well as reading object contents. Query service 308 uses pluggable evaluator objects that are dynamically located and attached for each request sent to data server 18. The evaluator objects are responsible for interfacing with and transforming the results from a query.

The object reporting service 310 is responsible for generating reports based on pre-defined report definitions and ad-hoc report queries. The reporting service 310 generates report definitions directly as opposed to generating client 22 program packages based on pre-defined code template files. The object reporting service 310 interprets the definitions at run-time, formulates the appropriate query, applies any post-query data transformations to the query results (formatting, filtering, sorting, etc.), and delivers these results to the client 22 in some optimal form. This optimal form delivery scheme is an attempt to reduce the number of transformations a given set of data must go through to eventually be used at the client 22 in a view 208 context. For example, the optimal form for report data that is to be shown in a view 208 in chart form might be a delimited data series sequence, whereas a report being presented in a view 208 as a topological graph may be optimally organized as an ordered list of nodes and edge objects.

The object status service 312 is responsible for managing those object types that have active, non-static operational states. Examples include managed objects, managed systems, and work lists. The status service 312 is a distributed component and thus makes no assumptions about the location of interested observers. The status service supports distributed notification by utilizing the ORB 300 (typically the Common Object Request Broker Architecture, known as CORBA) Event Service, which is a standardized mechanism for implementing the observer pattern.

Authorization service 314 provides user authorization support for data server 18 to determine levels of access that can be granted to client 22. Some data stored on data server 18 may be protected from access by client 22, and authorization service 314 controls that access.

Other services 318 include a presentation service that provides access to the information base 318 containing presentation-related information. The presentation service maintains presentation information at a userid level, while still providing the capability for users to share presentation (view 208) data. Examples of the presentation data maintained by this service include contexts, workspaces, and presentation properties (e.g., background color associated with a chart, images used as tree view nodes, and fonts associated with object labels).

Information base 318 is a database of the data, objects, etc. that is accessed by data server 18. The information base 318 is accessed through data server requester 320, and transportation and other data manipulation of the information base 318 is provided through transport 322.

Figure 4:
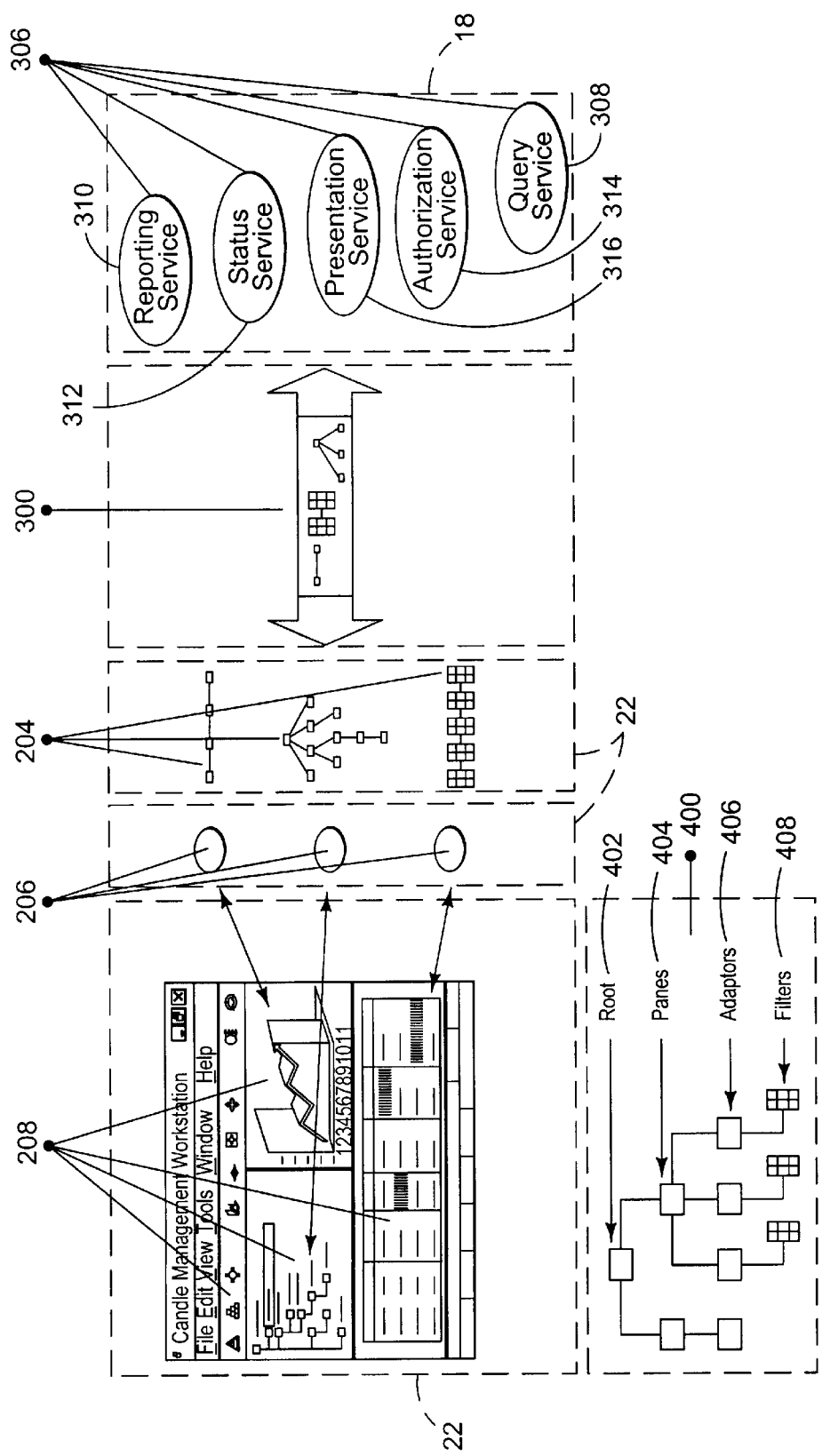
FIG. 4 illustrates an end-to-end data flow of the present invention.

FIG. 4 illustrates an end-to-end data flow of the present invention.

Data server 18, with object services 306, i.e., query service 308, reporting service 310, status service 312, authorization service 314, and presentation and other services 316, sends object data, etc. via ORB 300 to client 22. Within client 22, the object data is divided into models 204, workplace objects 206, and finally, view 208. View 208 is presented in a certain context 400, which has root 402, panes 404 of view 208, adapters 406, and filters 408. Context 400 allows the user to customize the view 208 to present the object data in a specific manner.

Figure 5:
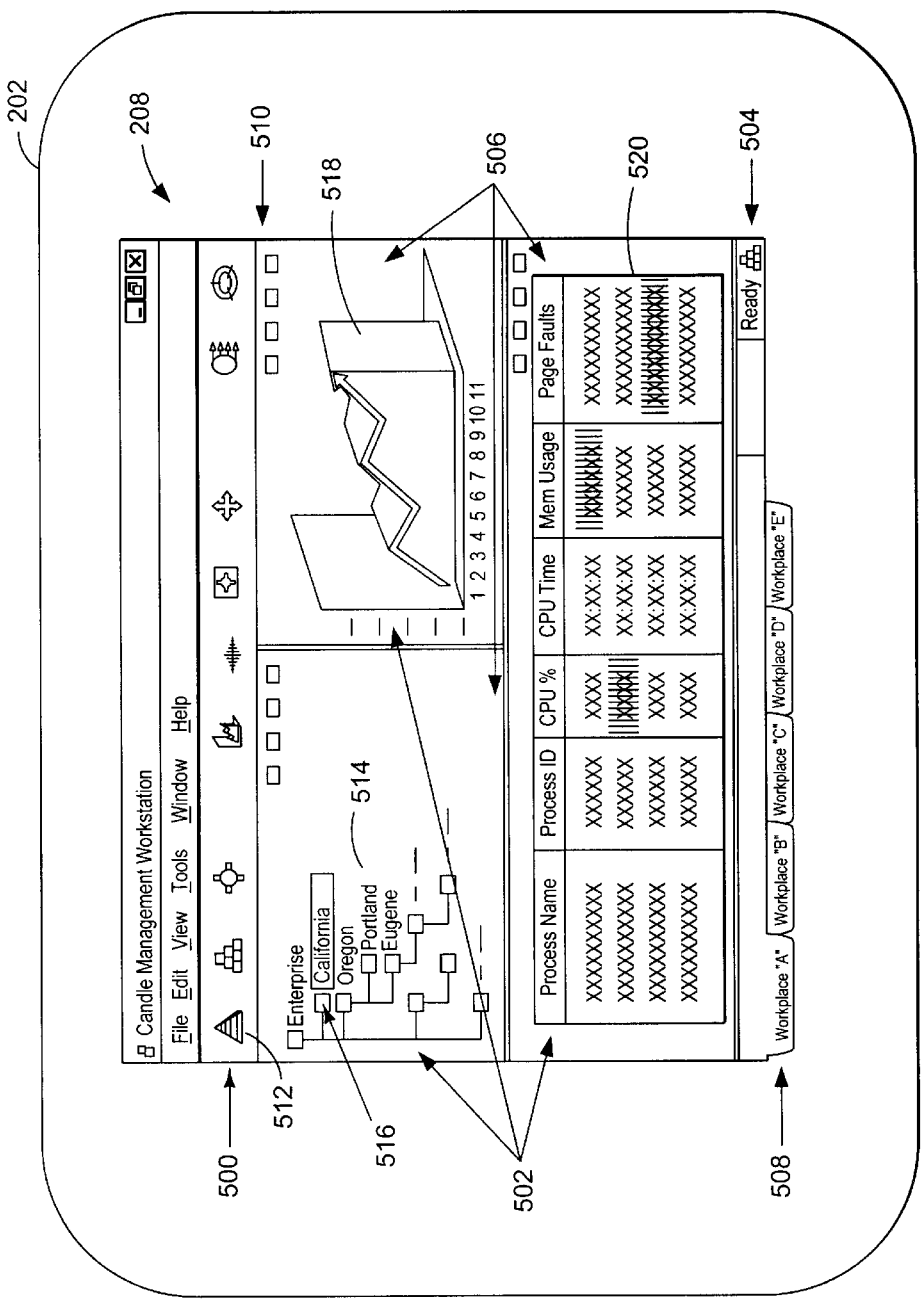
FIG. 5 illustrates the workspace view of the present invention.

FIG. 5 illustrates the workspace view of the present invention.

To present the data to the user, display device 202 typically presents windows of data and text. As shown in FIG. 5, display device 202 presents view 208 to the user, which is also known as a workspace. Within view 208, there are selection tools 500, presentation types 502, status line 504, panes 506, tabs 508, and pane tools 510.

Selection tools 500 allow the user to select presentations 502 that are available for the selected object. Tool 512, for example, allows a user to select a stacking bar chart for the view 208.

Presentations 502 are different visual presentations of the data model associated with the currently selected object. Tree 514 is illustrated in pane 506 and is known as the navigator pane 506. Tree 514 illustrates a tree structure that shows logical interactions between presentations and files. Workspace 516 is highlighted to illustrate to the user that is currently selected. The presentations 502 within panes 506 are all related to the context 516 that is currently selected.

Presentation 518 is a line graph of the data associated with the currently selected context 516. Presentation 520 is a chart of the data associated with the currently selected context 516.

Status line 504 gives the user the status of the data, e.g., ready, busy, reading, etc. This lets the user know that the data is either fully presented or is still being processed.

Panes 506 are user created areas within view 208 that present the data in a manner that the user selects. The panes 506 are "splittable," e.g., they can be sized, separated, or otherwise manipulated to fit within view 208.

Tabs 508 illustrate that there are various views 208 associated with the currently selected workspace 516. Any number of tabs 508 show the user that there are one, two, or several views 208 associated with the currently selected workspace 516. As shown in FIG. 5, there are five views 208 (Workspaces A through E) associated with workspace 516.

Pane tools 510 are tools to manipulate or otherwise view the data within that given pane 506.

This multiple, user-definable data view 208 on display 202 allows for a user to correlate data in various formats and from various sources. For a user that is only concerned with a small amount of data within the system, a single pane 506 may be sufficient. However, for a computer system manager, a usage by process bar chart or pie. chart may be more useful, and multiple panes 506 or multiple tabs 508 for several views 208 may be more suitable.

Each Client 22 can be associated with a given specific identifier to allow a user to access the Client 22. One specific identifier that can be used is user logon identifications (logon ID). This way, each user will, upon logging on to the system, have access to and, if desired, be placed in, Client 22, and therefore views 208, that they created and are most familiar with.

Each user can define more than one view 208, as shown by tabs 508, depending on the data and the tasks that the user wishes to monitor. Thus, a user can have multiple views 208 that the user can choose from, or, alternatively, have running simultaneously, so that the user can monitor data from several different places at once on different Clients 22, and possibly on different computer systems 12.

Figure 6:
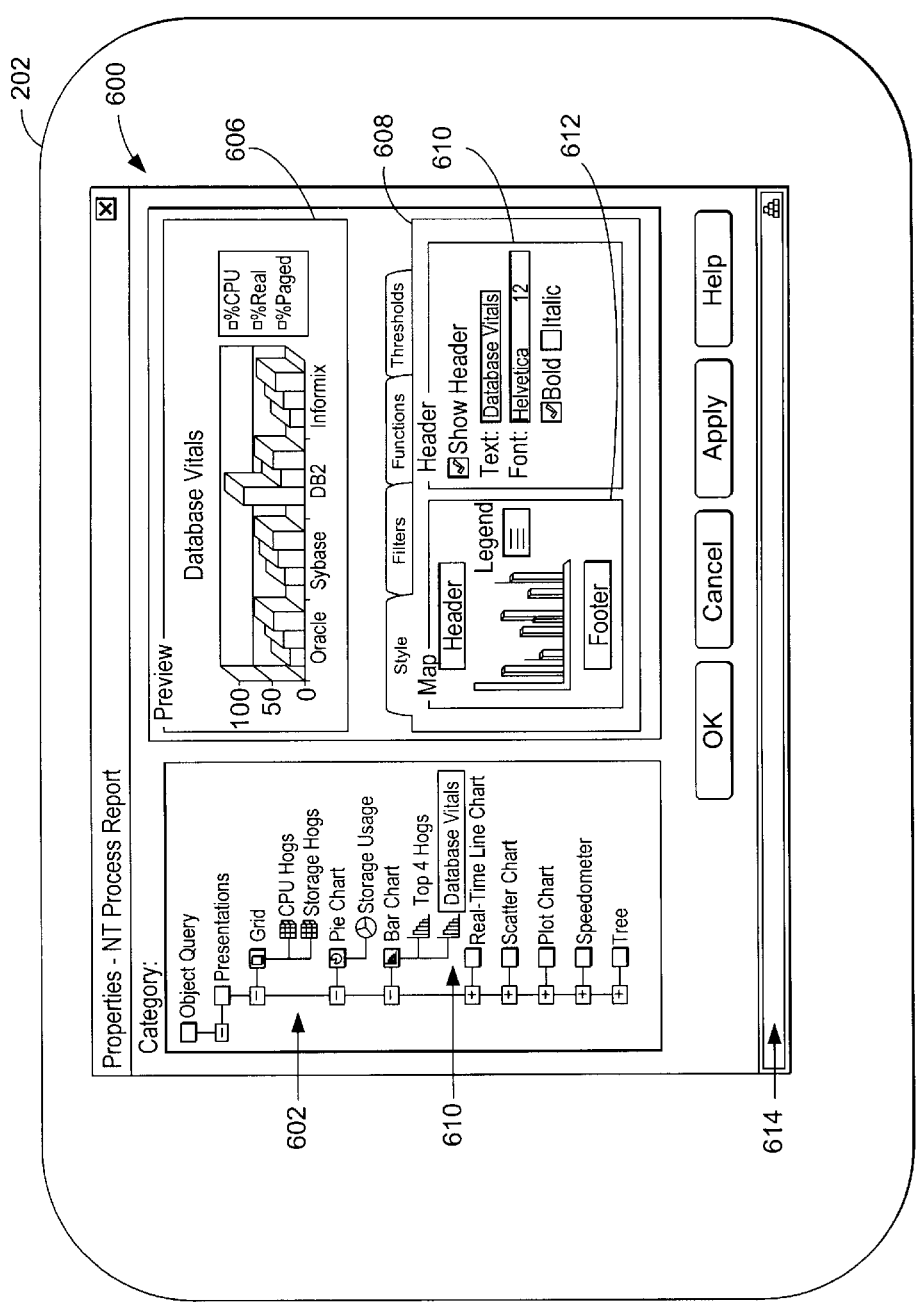
FIG. 6 illustrates a Properties view of the Workspace of the present invention.

FIG. 6 illustrates a Properties view of the Workspace of the present invention.

Display 202 is also used by the user to tailor the views within the Workspace to better present the data to the user's needs and desires. Properties window 600 contains several visual aids that assist the user in determining what view 208 will look like once the user has set all of the properties in the properties window 600. One area of the Properties window 600 is the object property tree 602, which organizes and groups the properties of the Workspace 400 for perusal and traversal by the user. For each property of the Workspace 400, the user can select a view 604, e.g., Database Vitals, and the remainder of properties window 600 will give the user a presentation preview pane 606 and a tabbed set of property styles, filters, and functions panes 608 associated with that view 604. Other panes are possible depending on the view 604 selected. Each specific graphical presentation or view within a Workspace 400 is grouped by presentation type, e.g., bar chart, and is listed as a node (also known as a leaf node) in the property category tree 602.

The presentation preview pane (or dialog) 606 shows the user what the presentation will look like when shown in the Workspace 208. The presentation preview pane 606 is a representation of the visual presentation that will appear in one of the panes 506 when the Workspace 208 is selected. The tabbed pane 608 typically comprises one or more sub dialogs, such as a property group style dialog 610 and a selectable image map 612. A status line 614 is also provided for user information purposes.

The user can then customize view 208 to present the data selected (i.e., Database Vitals) in a manner most suitable to the user. In the case of properties window 600, the user has selected to view Database Vitals as a bar chart, shown in presentation window 606, with a header and a legend selected from selectable image map 612, and has selected to show the header, reading "Database Vitals," in a twelve point Helvetica Bold font, selected from selectable image map 610.

Figure 7A:
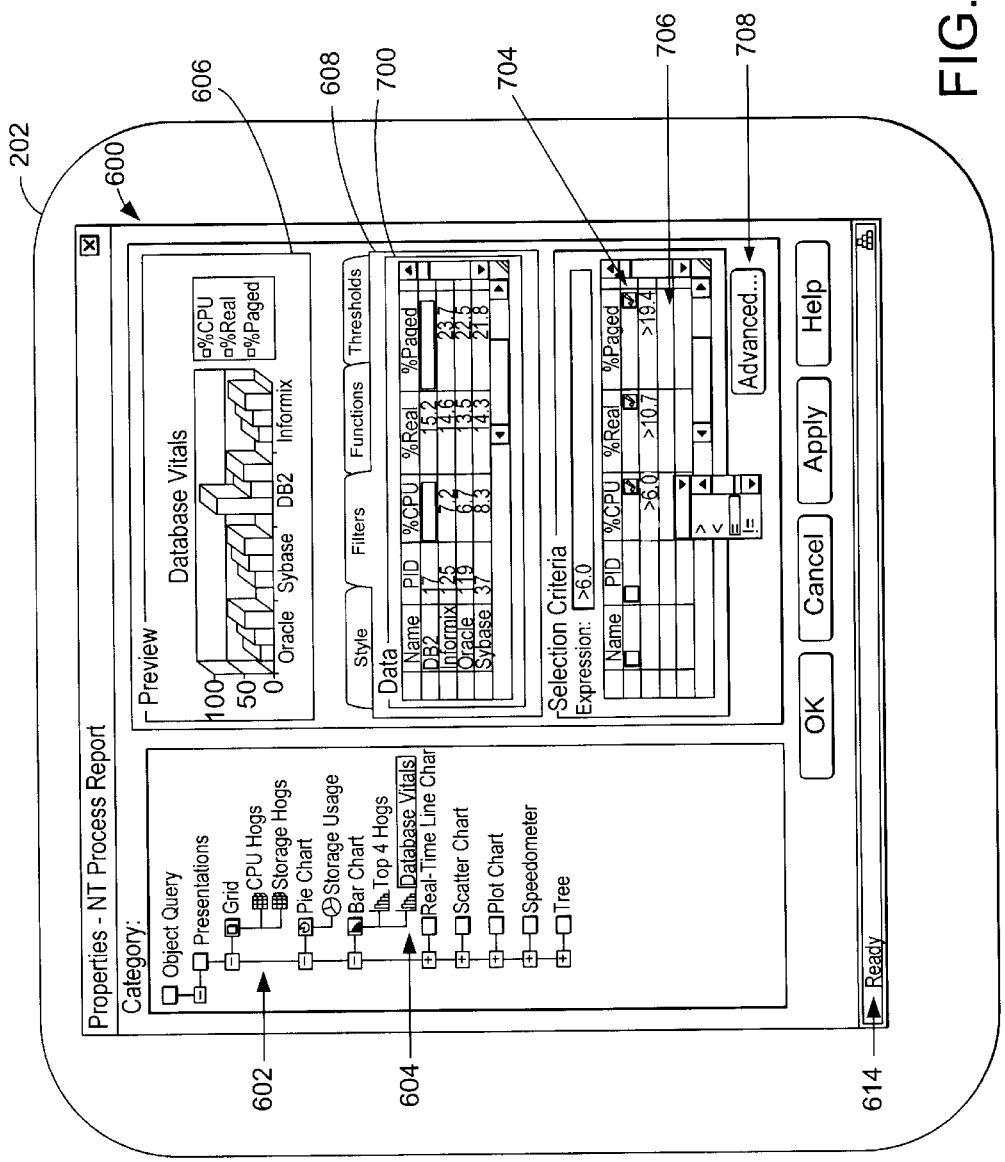
FIGS. 7A–7B illustrate the filtering functions of the properties page of the present invention.
Figure 7B:
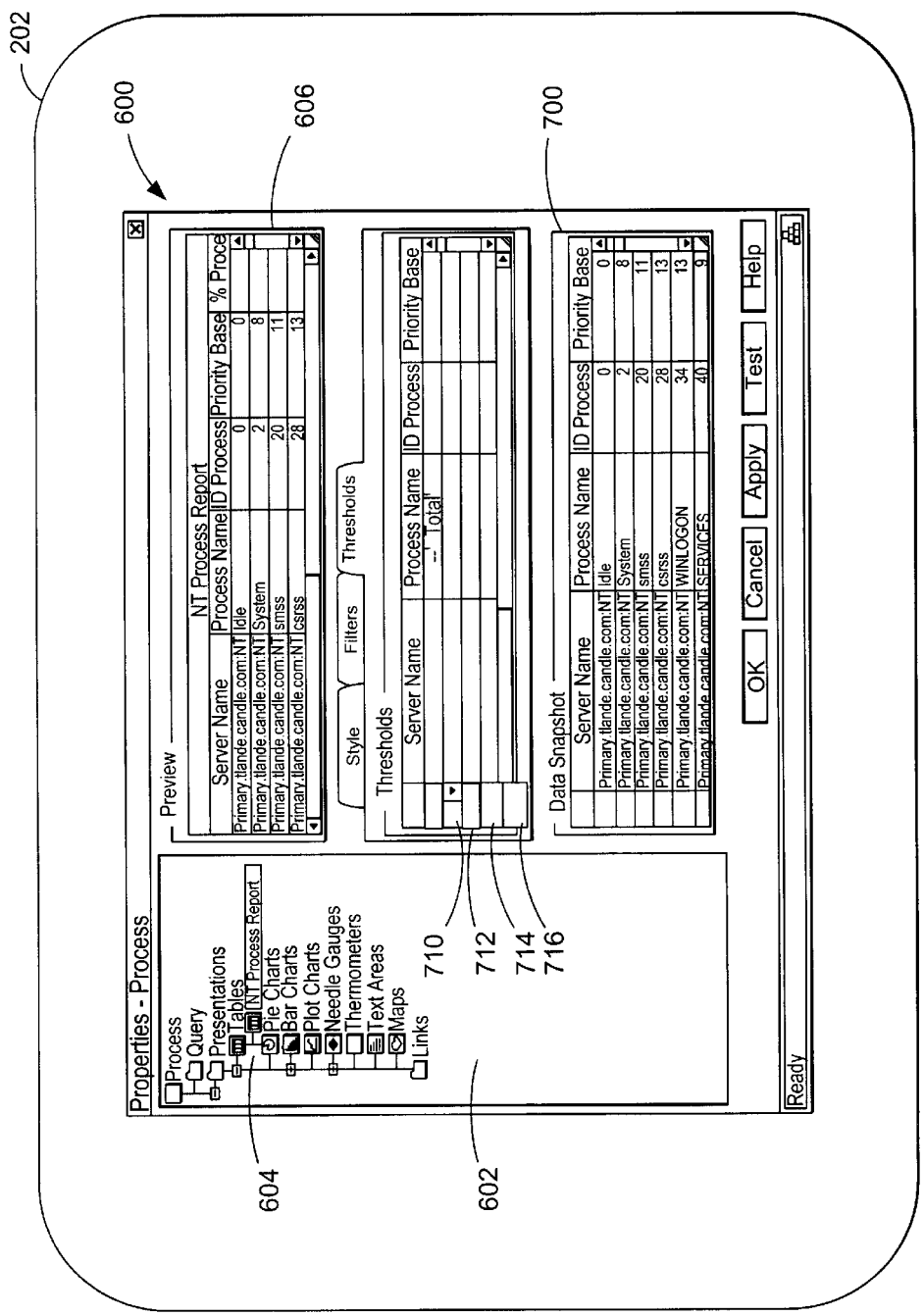

FIGS. 7A–7B illustrate the filtering functions of the properties page of the present invention.

As shown in FIG. 7, properties window 600, and tabbed panes 608 can be selected to show the filters tab for the selected property 604. For the filter tabbed pane 608, the data is presented to show data snapshot 700, a toggle 704 to determine visibility of the data, a criteria selector 706, and advanced options 708 for other presentations of the data.

For any given set of data, certain data or certain events are crucial to users. The filters pane 608 allows the user to select those criteria and presentation formats that will alert the user to desired or critical events. The data snapshot 700 provides the user a set of data that is "frozen" in time. This allows the user to see how the data presentation will change as the user changes the values in filter pane 608. This is done using the presentation preview pane 606.

The user can also select whether or not to see the data using the visibility toggles 704. For each selected data criteria, the user can select criteria using the criteria selector 706. As shown, the user only wants to see percentage of CPU usage (%CPU) when it is greater than six (>6.0). If the user wants to perform more advanced data filtering, the advanced options selector 708 provides the user more flexibility in performing data manipulation and presentation.

FIG. 7B illustrates the threshold function page for the filtered data. For a given snapshot 700, the user can set a threshold for each specific piece of data to make the data easier to identify and determine if there is a problem within the system. Selector 710 allows a user to define a visual signal for each piece of data that, when the data exceeds a predefined threshold, will change the color or other presentation of the data within snapshot 700. Signals 712–716 are shown as examples of defining threshold data visual identifiers for the user. Signal 712 is a severe or urgent flag, usually a red color, but can be another identifier. Signal 714 is a warning or moderate alarm or visual flag, which is a notification to the user that something is approaching critical or severe limits, but has not reached the level of signal 712. Signal 714 usually a yellow color, but can be another identifier. Signal 716 is a notification or lesser alarm than signal 714, and is typically a blue color, but can be another identifier. There can be more signals 712–716 if desired, and the red, yellow, and blue signals indicated for signals 712–716 are not intended to limit the present invention.

Figure 8:
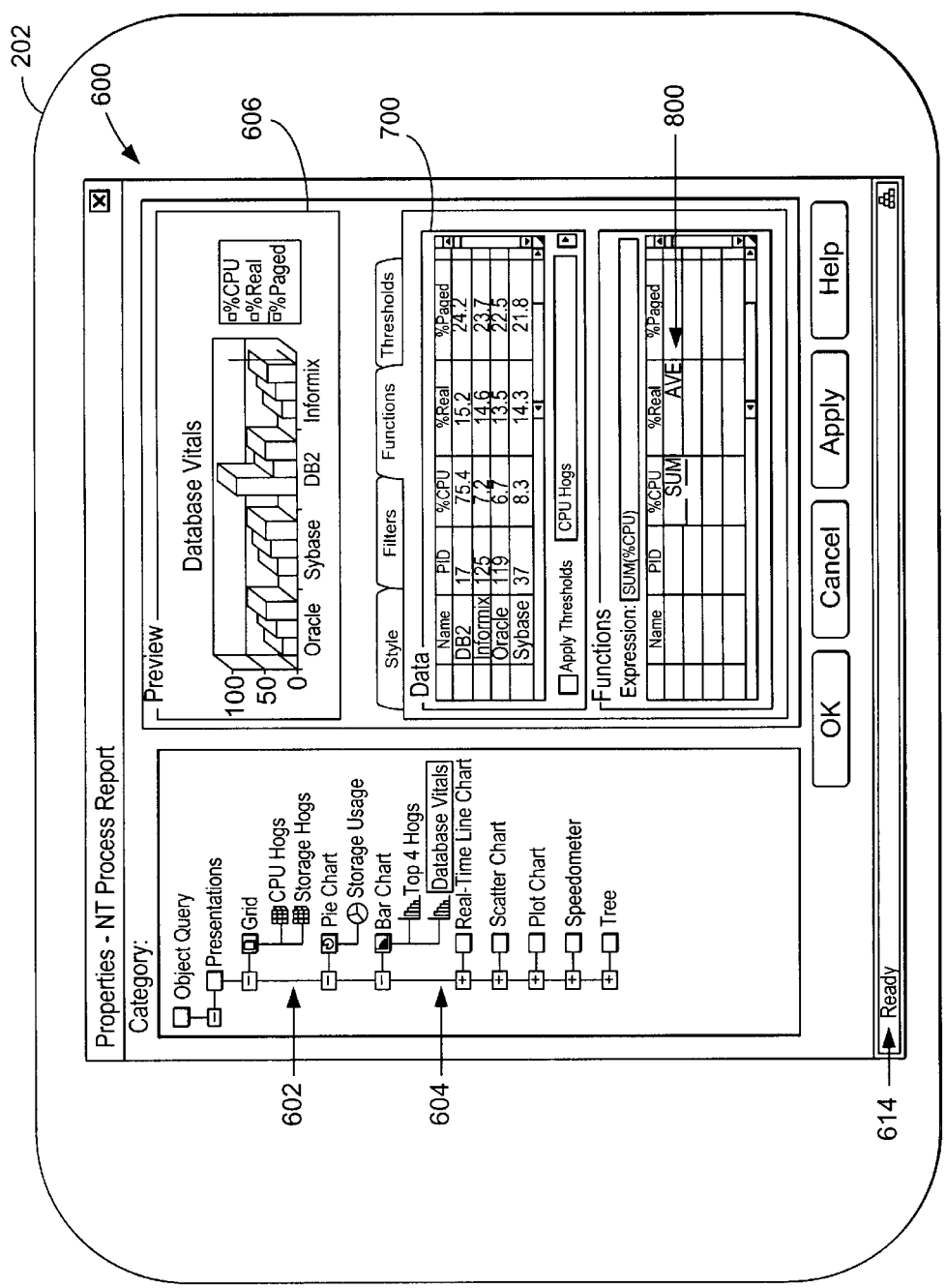
FIG. 8 illustrates the functions definitions for the filtered data of the properties page of the present invention.

FIG. 8 illustrates the functions definitions for the filtered data of the properties page of the present invention.

Using the data snapshot 700, the user can define new values for presentation based on the filtered data specified on the filters pane 608. The user can specify an expression on the expressions pane 800, e.g., "SUM," to provide a defined value for that variable. Other defined values, such as average, greatest, least, etc., are also definable by the user.

Figure 9:
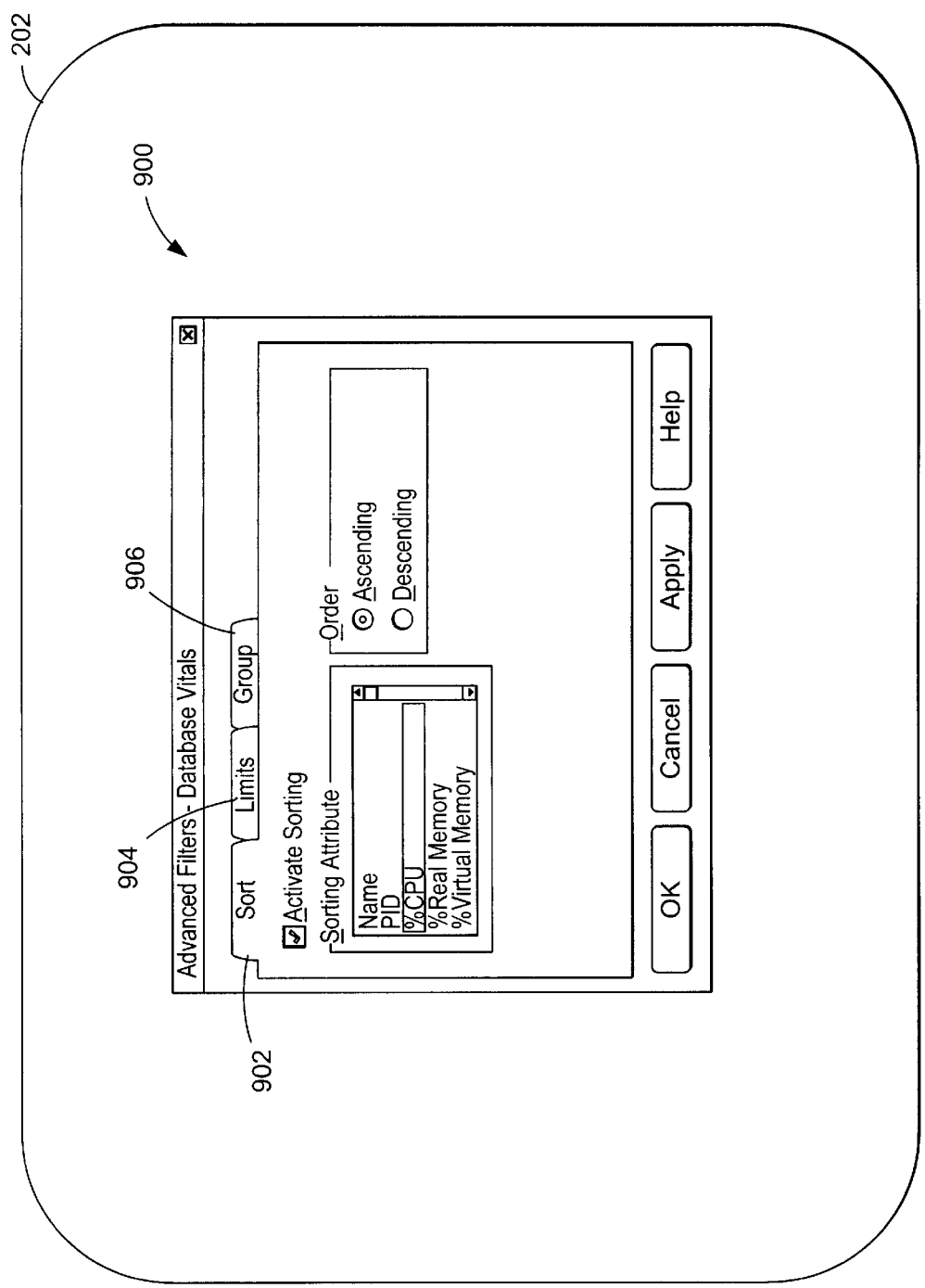
FIGS. 9–11 illustrate the advanced filters dialogs used for manipulating the data of the present invention.
Figure 10:
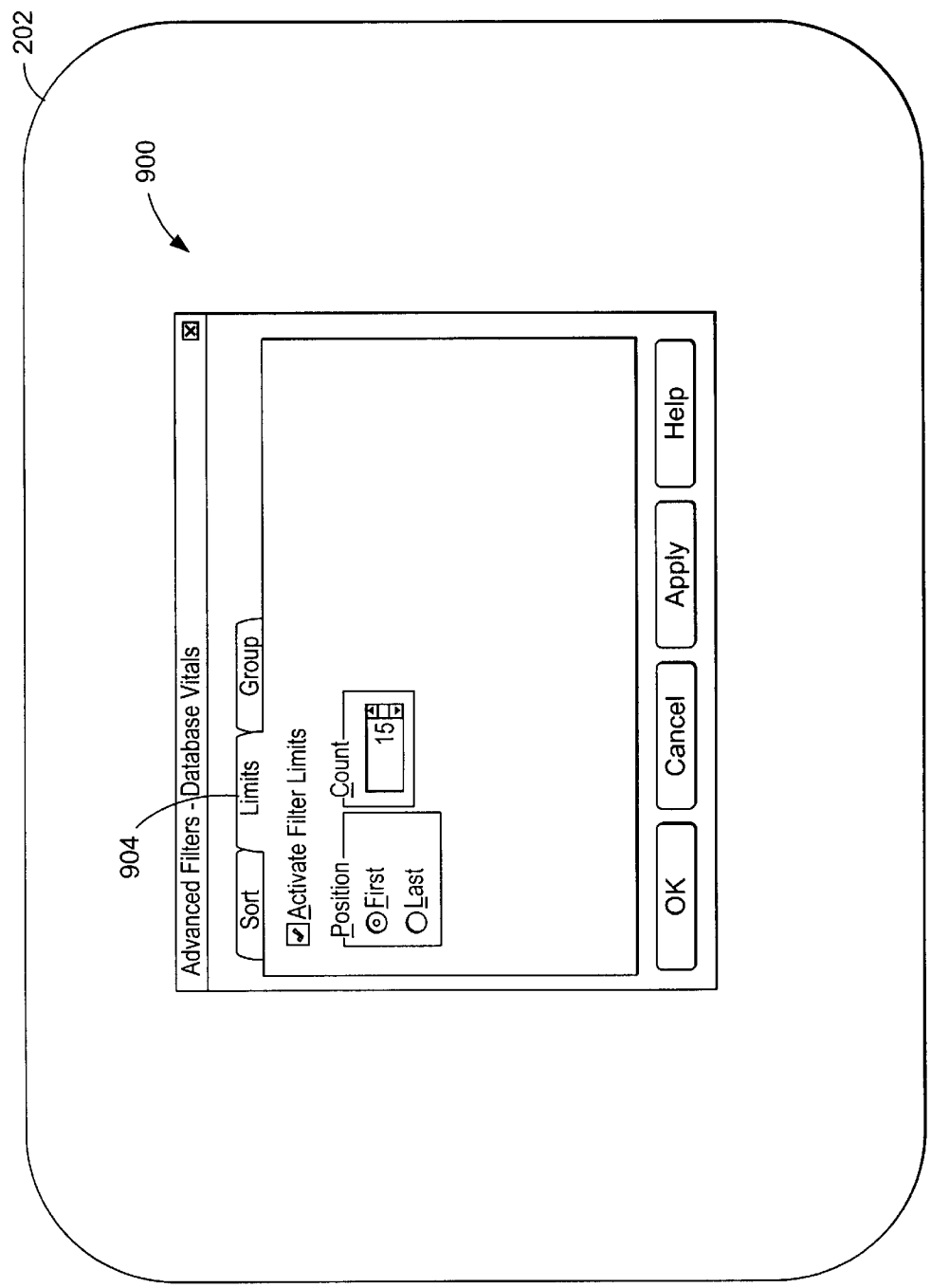
Figure 11:
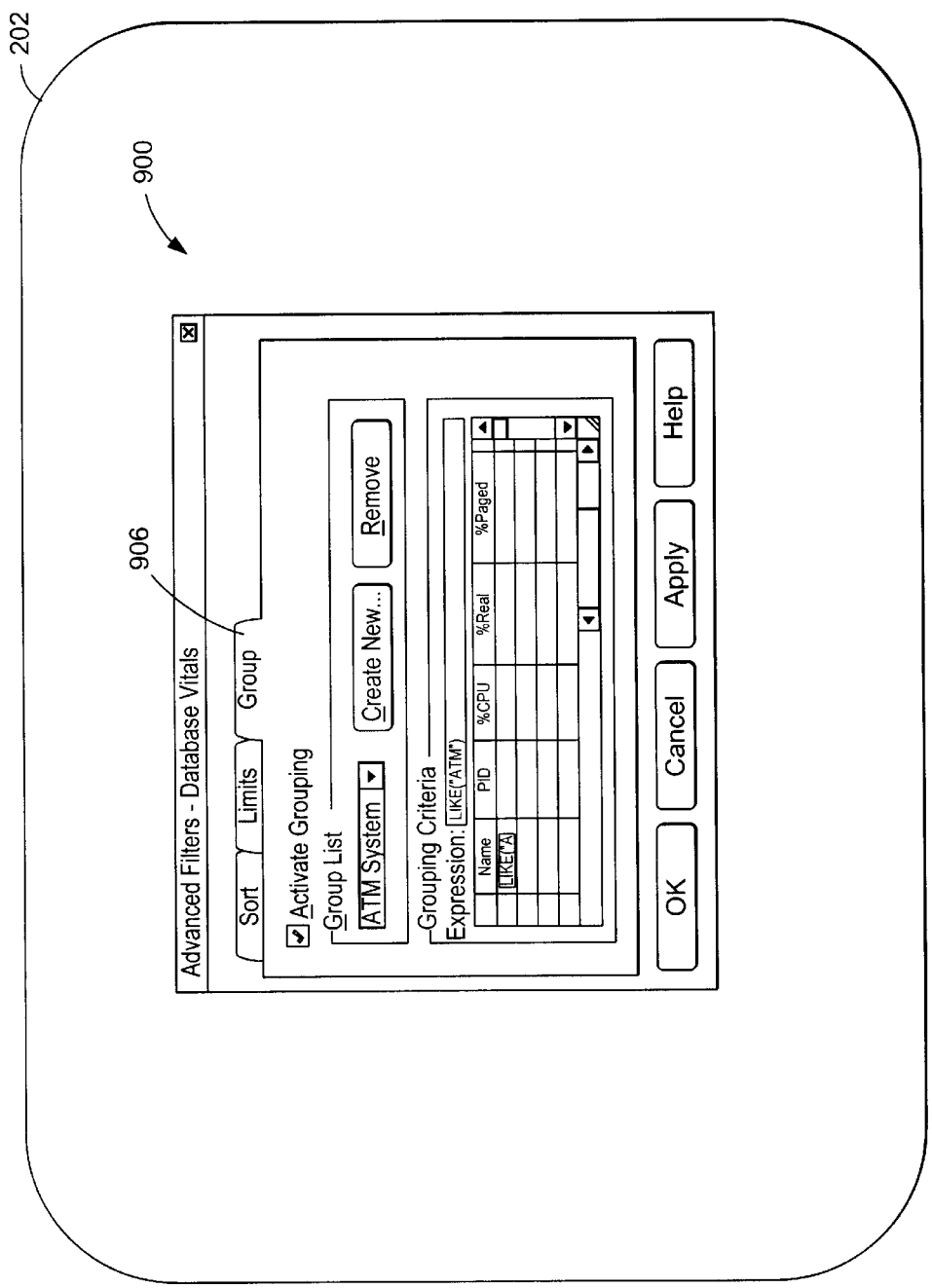

FIGS. 9–11 illustrate the advanced filters dialogs used for manipulating the data of the present invention.

FIGS. 9–11 illustrate tabbed dialogs within window 900. Window 900 is activated and shown to the user on display 202 when the user selects the advanced button 708 shown in FIG. 7. The user can select any of the tabbed dialogs 902–906. Tabbed dialog 902 shown in FIG. 9 allows the user to turn sorting on and off, sort the attributes in ascending or descending order, and choose which attributes are to be sorted for a given view 208.

FIG. 10 shows dialog 904, which allows the user to select limits on the filter and activate or deactivate the limits selected. FIG. 11 shows dialog 906, which allows the user to create groups of attributes and select criteria to group attributes for display within view 208.

Logic of the Management Interface

Figure 12:
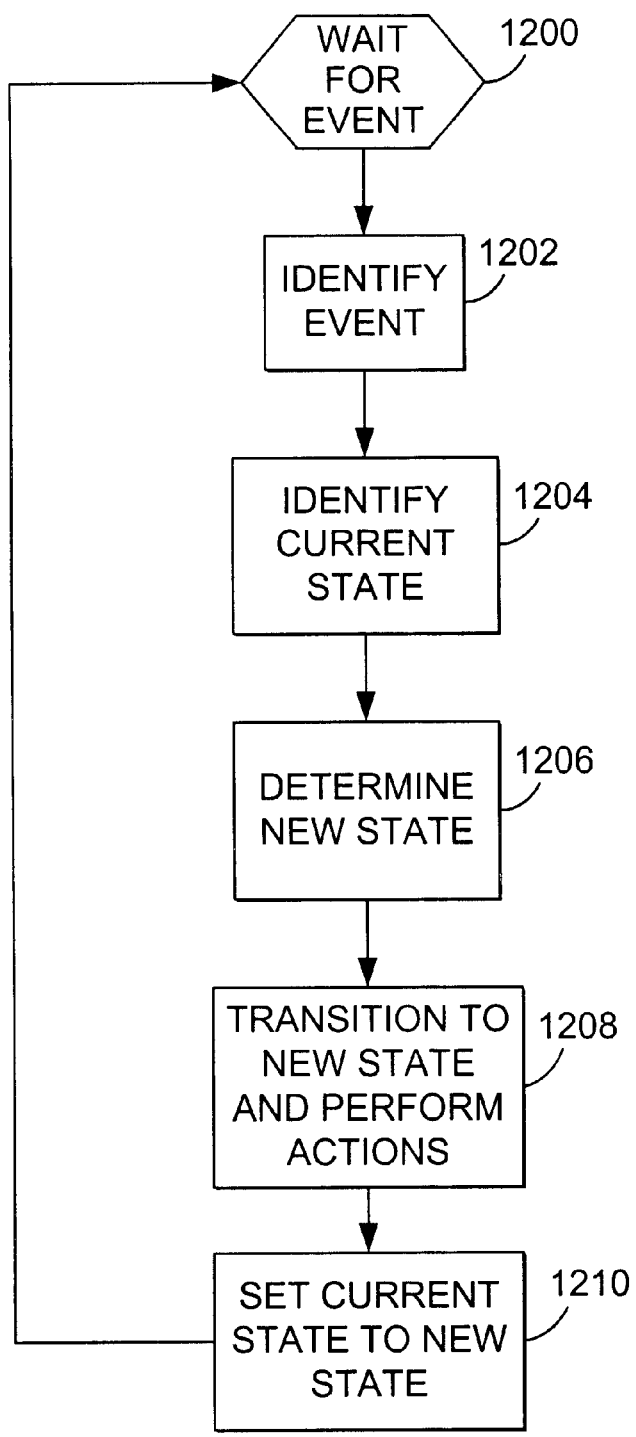
FIG. 12 is a flowchart that illustrates the general logic of a message or event-driven computer 12 performing the steps of the present invention.

FIG. 12 is a flowchart that illustrates the general logic of a message or event-driven computer 12 performing the steps of the present invention. In such a computer 12, operations are performed when transitions are made, based upon the receipt of messages or events, from present or current states to new states.

Generally, the flowchart begins by waiting at block 1200 for an event (e.g., a mouse button click). It should be appreciated that during this time, other operating system tasks, e.g., file, memory, and video tasks, etc., may also be carried out. When an event occurs, control passes to block 1202 to identify the event. Based upon the event, as well as the current state of the system determined in block 1204, a new state is determined in block 1206. In block 1208, the logic transitions to the new state and performs any actions required for the transition. In block 1210, the current state is set to the previously determined new state, and control returns to block 1200 to wait for more input events.

The specific operations that are performed by block 1208 when transitioning between states will vary depending upon the current state and the event. The various operations required to implement and maintain the Client of the present invention represent particular events handled by the logic. However, it should be appreciated that these operations represent merely a subset of all of the events handled by the computer 12.

Figure 13:
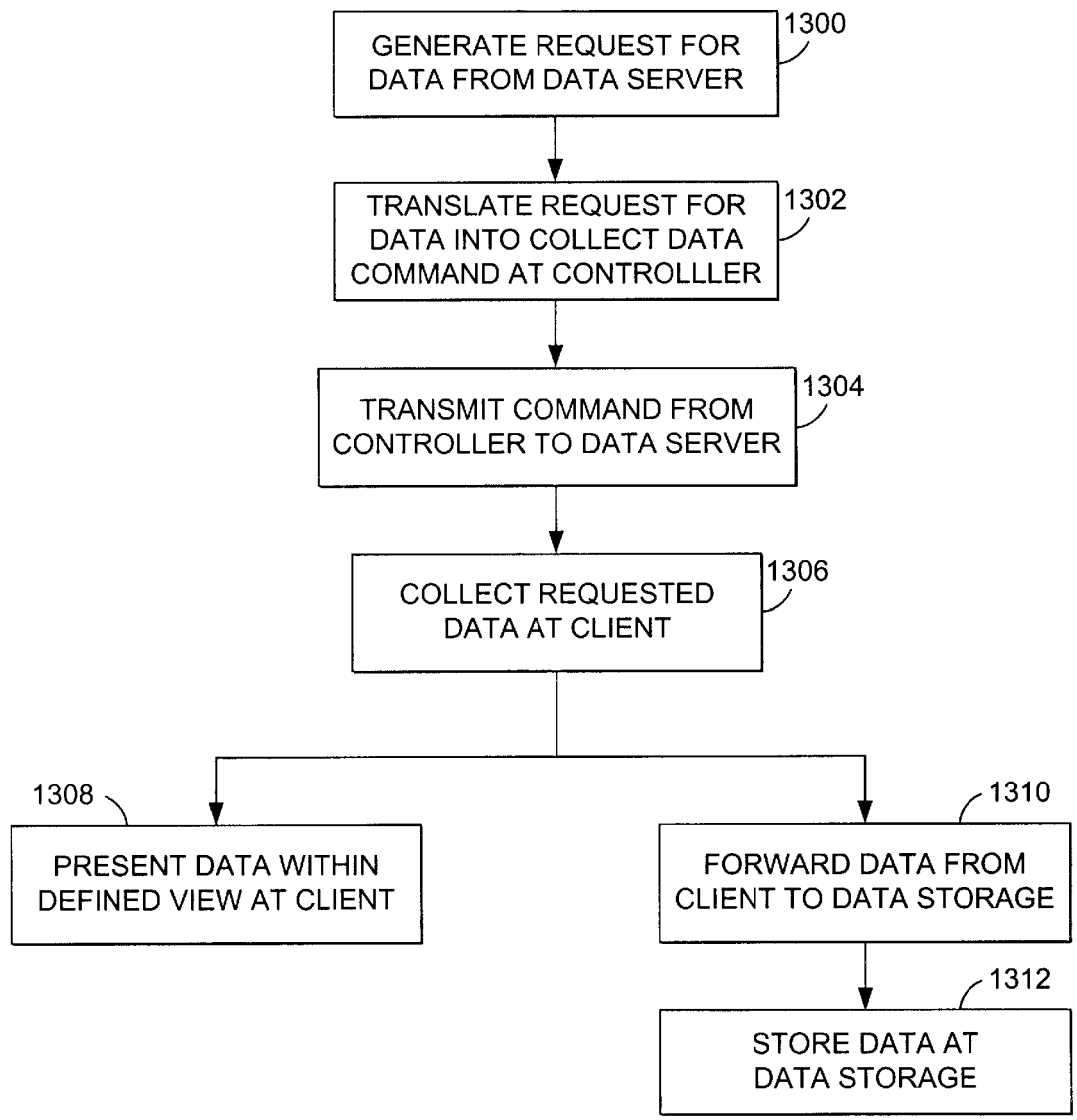
FIG. 13 is a flowchart illustrating the steps performed in practicing the present invention.

FIG. 13 is a flowchart illustrating the steps performed in practicing the present invention.

Block 1300 represents the client 22 generating a request for data from the data server 18.

Block 1302 represents the computer system 12 translating the request for data into a collect data command at the controller.

Block 1304 represents the computer system 12 transmitting the command from the controller to the data server 18.

Block 1306 represents the computer system 12 collecting the requested data from the data server 18 at the client 22.

Block 1308 represents the computer system 12 presenting the requested data in a defined presentation view at the Client 22.

In parallel with block 1308, block 1310 represents the computer system 12 forwarding the collected data from the Client 22 to the data server. Block 1312 represents the computer system 12 storing the data at the data server, either at the data storage device or other storage media.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the technique of multi-threading and/or object-oriented programming could benefit from the present invention.

In summary, the present invention discloses a system for presenting performance and system management data on a computer monitor. The system comprises a network, one or more presentation views, a data server, and a controller. The network interconnects a plurality of computer systems. The presentation views are defined in a memory of one of the computer systems in the network, receive commands for collecting selected performance data on the presentation view's associated computer system, and collect and present the selected performance data. The data server is executed by one of the computer systems in the network, generates requests for the selected performance data, and stores the collected selected performance data returned in response to the requests. The controller is executed by one of the computer systems in the network, translates the requests generated by the data server into the commands for the presentation views, transmits the commands to the presentation views, and forwards the collected performance data to the data server for storage.

The present invention allows for various data sources to be presented and compared within one window that is definable by the user, as opposed to multiple windows defined by the authors of the operating system for the computer. This allows users more flexible access to data, as well as better and more efficient use of computer resources.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A network monitoring system, comprising:
(a) one or more computer systems interconnected on a network; and
(b) a client, executed by one of the computer systems, wherein the client comprises one or more user-customized presentation views and wherein the client is configured to:
(i) receive user-defined requests for retrieving selected performance data on the user-customized presentation view's associated computer system;
(ii) retrieve the selected performance data from a data server, wherein the performance data is stored on and collected by the data server in accordance with the received requests;
(iii) retrieve one or more definitions for the one or more user-customized presentation views from the data server, wherein:
(1) the one or more definitions define one or more user-customized graphical user interfaces;
(2) the one or more definitions are stored on the data server; and
(3) the one or more definitions are associated with a specific identifier that corresponds to one or more users such that access control of the definitions is based on the specific identifier; and
(iv) present the retrieved selected performance data in one or more of the user-customized graphical user interfaces in accordance with one or more of the definitions.

2. The network monitoring system of claim 1, wherein the user-defined requests for collecting the selected performance data comprise commands for filtering the performance data.

3. The network monitoring system of claim 2, wherein the commands for filtering the performance data are logical expressions definable by a user of the computer system.

4. The network monitoring system of claim 1, wherein multiple presentation views are defined for presentation of the performance data, wherein each presentation view presents a different set of data.

5. The network monitoring system of claim 5, wherein the multiple presentation views are presented simultaneously.

6. The network monitoring system of claim 1, wherein the specific identifier is a logon identifier.

7. The network monitoring system of claim 1, wherein the performance data is selected from multiple data sources.

8. The system of claim 1 wherein the client further comprises a controller configured to receive the user-defined requests through the graphical user interface from one or more input devices.

9. The system of claim 1 wherein a presentation view is managed by a workplace object.

10. The system of claim 1 wherein the client further comprises a model that is configured to communicate with the data server to request and receive the performance data.

11. The system of claim 1 wherein the data server is executed by one of the computer systems and provides object-based services to access, report, and manipulate the performance data requested by the client.

12. The system of claim 1 wherein the selected collected performance data is presented in the user-customized graphical user interface in a specific manner specified in a user-customizable context.

13. A program storage device, readable by a computer, tangibly embodying one or more programs of instructions executable by the computer to perform a method of presenting data on a computer monitor, the method comprising:
   (a) receiving a user-defined request for performance data;
   (b) translating the request for user-defined performance data into a collect performance data command;
   (c) transmitting the collect performance data command to a data server wherein the performance data is stored on and collected by the data server;
   (d) receiving the requested performance data from the data server;
   (e) receiving one or more definitions for one or more user-customized presentation views from the data server, wherein:
      (i) the one or more definitions define one or more user-customized graphical user interfaces;
      (ii) the one or more definitions are stored on the data server; and
      (iii) the one or more definitions are associated with a specific identifier that corresponds to one or more users such that access control of the definitions is based on the specific identifier; and
   (f) presenting the received requested performance data in one or more of the customized graphical user interfaces in accordance with one or more of the definitions.

14. The program storage device of claim 13, wherein the user-defined request for performance data comprises a command for filtering the performance data.

15. The program storage device of claim 14, wherein the command for filtering the performance data is a logical expression definable by a user of the computer.

16. The program storage device of claim 13, wherein multiple presentation views are defined for presentation of the performance data, wherein each presentation view presents a different set of data.

17. The program storage device of claim 16, wherein the multiple presentation views are presented simultaneously.

18. The program storage device of claim 13, wherein the specific identifier is a logon identifier.

19. The program storage device of claim 13, wherein the performance data is selected from multiple data sources.

20. The program storage device of claim 13 wherein the user-defined requests are received through the graphical user interface from one or more input devices.

21. The program storage device of claim 13 wherein a presentation view is managed by a workplace object.

22. The program storage device of claim 13 wherein the data server provides object-based services to access, report, and manipulate the performance data.

23. The program storage device of claim 13 wherein the selected collected performance data is presented in the user-customizable graphical user interface in a specific manner specified in a user-customizable context.

24. A method for presenting performance data comprising:
   (a) receiving user-defined requests for collecting selected performance data, wherein the performance data comprises performance information for one or more computer systems interconnected on a network;
   (b) retrieving the selected performance data stored on a data server in accordance with the received requests, wherein the performance data is stored on and collected by the data server;
   (c) receiving one or more definitions for one or more user-customized presentation views from the data server, wherein:
      (i) the one or more definitions define one or more user-customized graphical user interfaces;
      (ii) the one or more definitions are stored on the data server; and
      (iii) the one or more definitions are associated with a specific identifier that corresponds to one or more users such that access control of the definitions is based on the specific identifier; and
   (d) presenting the received selected performance data in one or more of the user-customized graphical user interfaces in accordance with one or more of the definitions.

25. The method of claim 24, wherein the user-defined request for performance data comprises a command for filtering the performance data.

26. The method of claim 25, wherein the command for filtering the performance data is a logical expression definable by a user of the computer system.

27. The method of claim 24, wherein the specific identifier is a logon identifier.

28. The method of claim 24, wherein multiple presentation views are defined for presentation of the performance data, wherein each presentation view presents a different set of data.

29. The method of claim 28, wherein the multiple presentation views are presented simultaneously.

30. The method of claim 24, wherein the performance data is selected from multiple data sources.

31. The method of claim 24, wherein the user-defined requests are received through the graphical user interface from one or more input devices.

32. The method of claim 24, wherein the data server provides object-based services to access, report, and manipulate the performance data.

33. The method of claim 24, wherein the selected collected performance data is presented in the user-customizable graphical user interface in a specific manner specified in a user-customizable context.

34. The method of claim 24 wherein further comprising a controller receiving the user-defined requests through the graphical user interface from one or more input devices.

* * * * *

UNITED STATES PATENT AND TRADEMARK OFFICE
CERTIFICATE OF CORRECTION

PATENT NO. : 6,505,246 B1  Page 1 of 1
DATED : January 7, 2003
INVENTOR(S) : Timothy Lloyd Land and Barry William Laffoon It is certified that error appears in the above-identified patent and that said Letters Patent is hereby corrected as shown below:

<u>Column 10,</u>
Line 60, "5" should read -- 4 --

Signed and Sealed this

Fifth Day of August, 2003

JAMES E. ROGAN
*Director of the United States Patent and Trademark Office*